United States Patent
Grimm et al.

(10) Patent No.: US 10,462,193 B2
(45) Date of Patent: Oct. 29, 2019

(54) VEHICLE ADD-ON MULTIMEDIA PLAYBACK AND CAPTURE DEVICES

(71) Applicant: GM Global Technology Operations LLC, Detroit, MI (US)

(72) Inventors: Donald K. Grimm, Utica, MI (US); Fan Bai, Ann Arbor, MI (US); Dan Shan, Troy, MI (US); Xi Ju, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 230 days.

(21) Appl. No.: 15/616,629

(22) Filed: Jun. 7, 2017

(65) Prior Publication Data

US 2018/0359298 A1    Dec. 13, 2018

(51) Int. Cl.
| | |
|---|---|
| *H04L 29/06* | (2006.01) |
| *H04W 4/44* | (2018.01) |
| *H04W 4/80* | (2018.01) |
| *H04W 4/40* | (2018.01) |
| *H04L 29/08* | (2006.01) |
| *H04W 4/48* | (2018.01) |

(52) U.S. Cl.
CPC ...... *H04L 65/1059* (2013.01); *H04L 65/4084* (2013.01); *H04W 4/44* (2018.02); *H04L 67/125* (2013.01); *H04W 4/40* (2018.02); *H04W 4/48* (2018.02); *H04W 4/80* (2018.02)

(58) Field of Classification Search
CPC .. H04L 65/1059; H04L 65/4084; H04W 4/80; H04W 4/40
See application file for complete search history.

(56) References Cited

U.S. PATENT DOCUMENTS

| | | | | |
|---|---|---|---|---|
| 9,992,317 | B2* | 6/2018 | Elliott | H04M 1/6091 |
| 2005/0266879 | A1* | 12/2005 | Spaur | H04L 12/4625 |
| | | | | 455/556.2 |
| 2014/0005880 | A1* | 1/2014 | Guenkova-Luy | H04L 41/069 |
| | | | | 701/31.4 |
| 2014/0073308 | A1* | 3/2014 | Kim | H04W 4/40 |
| | | | | 455/418 |
| 2014/0074318 | A1* | 3/2014 | Lim | H04L 63/08 |
| | | | | 701/2 |

(Continued)

*Primary Examiner* — Blake J Rubin
(74) *Attorney, Agent, or Firm* — Reising Ethington P.C.

(57) ABSTRACT

A portable communication device, for implementation with a host vehicle of transportation having an on-board diagnostics port and a limited-access head-unit display. The device includes an on-board diagnostics connector sized and shaped to connect to the on-board diagnostics port of the host vehicle, a hardware-based processing unit in communication with the on-board diagnostics; and a non-transitory storage device in communication with the processing unit, the storage device. The storage includes a media-options presentation module that, when executed by the processing unit: sends, by way of the on-board diagnostics connector and port, media-options data to the host vehicle for presenting user media options by way of the limited-access head-unit display; and receives user-selection data responding to the user media options. The storage also includes a media streaming module that, when executed obtains streaming media based on the user-selection data, and sends the streaming media to the host vehicle for presentation.

13 Claims, 5 Drawing Sheets

(56) References Cited

U.S. PATENT DOCUMENTS

| | | | | |
|---|---|---|---|---|
| 2014/0095014 | A1* | 4/2014 | Rude | G07C 5/008 701/31.4 |
| 2015/0051787 | A1* | 2/2015 | Doughty | G07C 5/008 701/31.5 |
| 2015/0071115 | A1* | 3/2015 | Neff | H04L 12/40 370/254 |
| 2015/0105971 | A1* | 4/2015 | Naamani | H04W 4/80 701/33.2 |
| 2015/0191135 | A1* | 7/2015 | Ben Noon | B60R 16/023 726/22 |
| 2016/0066127 | A1* | 3/2016 | Choi | H04L 67/12 455/41.2 |
| 2016/0134383 | A1* | 5/2016 | Banasky, Jr. | H04B 1/40 455/67.14 |
| 2016/0270144 | A1* | 9/2016 | Thanayankizil | H04B 1/3822 |
| 2017/0076515 | A1* | 3/2017 | Nyalamadugu | G07C 5/0808 |
| 2017/0134164 | A1* | 5/2017 | Haga | B60R 16/023 |
| 2017/0155720 | A1* | 6/2017 | Song | G06F 8/38 |
| 2017/0201619 | A1* | 7/2017 | Cohen | H04M 1/6075 |
| 2017/0228126 | A1* | 8/2017 | Kim | G02B 6/0055 |
| 2017/0247000 | A1* | 8/2017 | Ricci | G06K 9/00302 |
| 2018/0004213 | A1* | 1/2018 | Absmeier | H04W 4/70 |
| 2018/0006829 | A1* | 1/2018 | Kravitz | H04L 9/3255 |
| 2018/0120147 | A1* | 5/2018 | Hall | G01G 19/02 |
| 2018/0192266 | A1* | 7/2018 | Park | H04W 88/04 |
| 2018/0317067 | A1* | 11/2018 | Ameixieira | H04W 4/46 |

* cited by examiner

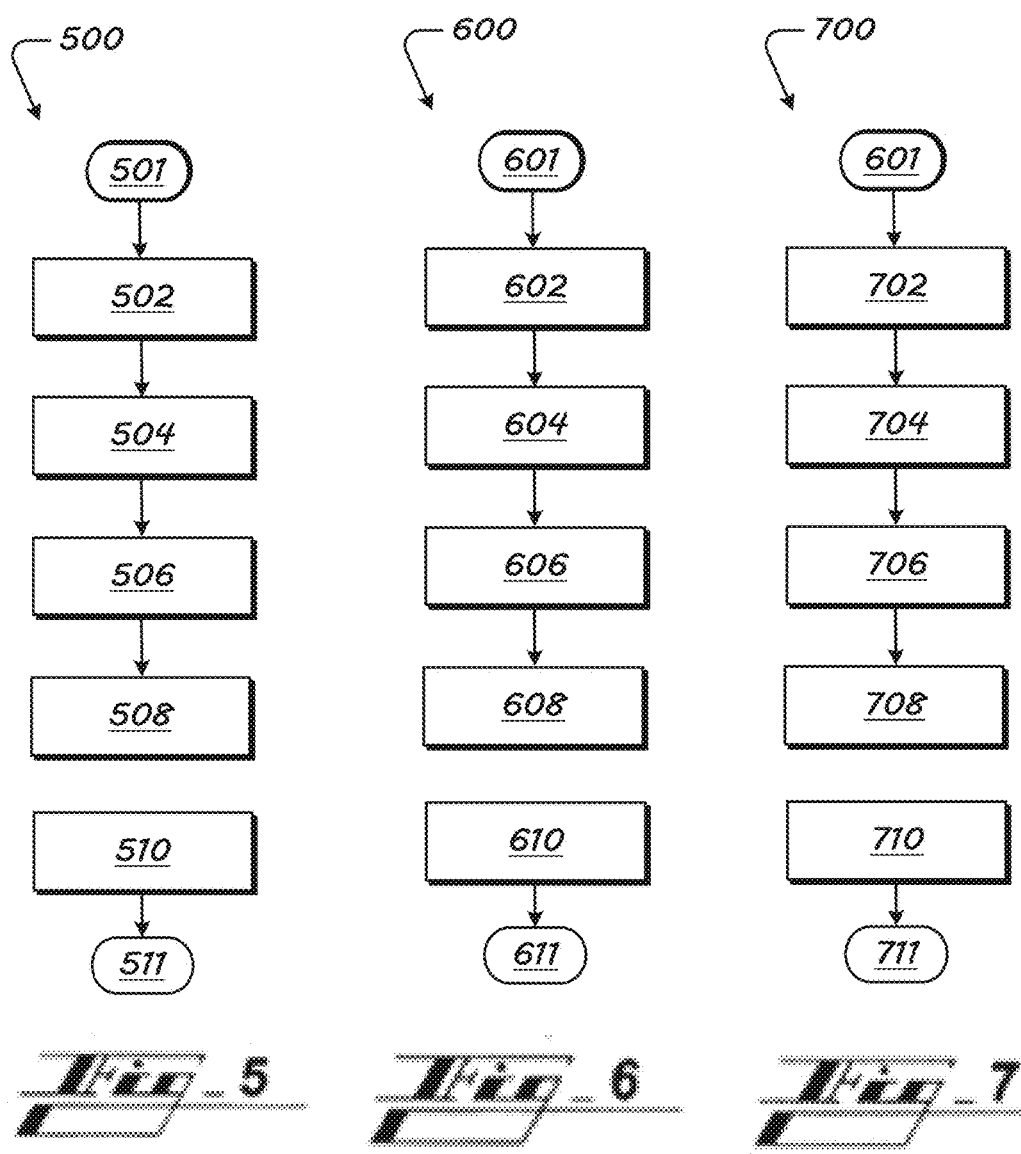

VEHICLE ADD-ON MULTIMEDIA PLAYBACK AND CAPTURE DEVICES

TECHNICAL FIELD

The present disclosure relates generally to vehicle media or infotainment systems and, more particularly, to arrangements including add-on streaming devices for leveraging vehicle communications and infotainment capabilities.

BACKGROUND

Many modern automobiles are equipped by original equipment manufacturers (OEMs) with an infotainment unit that can present radio or satellite audio entertainment.

The infotainment is limited to the programs that are loaded to the vehicle. For arrangements in which a mobile device such as a user phone projects information to the vehicle, such as audio media, the interaction is limited to the simple delivery of such audio.

SUMMARY

The present technology solves these and other challenges. One aspect of the solution involves providing at least one portable communication device configured to access the automobile head unit so as to present media options or other user-interaction information by way of the head unit, such as a display of the head unit, or an audio command provided by head unit.

In a particular aspect, the solution relates to a portable communication device, for implementation with a host vehicle of transportation having an on-board diagnostics port and a limited-access head-unit display. The portable device may be referred to as an add-on device, or non-vehicle device, because it is put in communication with the vehicle, such as by plug/port or wireless connection (e.g., Bluetooth), but not a part of the vehicle.

The device includes an on-board diagnostics connector sized and shaped to connect to the on-board diagnostics port of the host vehicle, a hardware-based processing unit in communication with the on-board diagnostics; and a non-transitory storage device in communication with the processing unit, the storage device. The storage includes a media-options presentation module that, when executed by the processing unit: sends, by way of the on-board diagnostics connector and port, media-options data to the host vehicle for presenting user media options by way of the limited-access head-unit display; and receives user-selection data responding to the user media options. The storage also includes a media streaming module that, when executed by the processing unit obtains streaming media based on the user-selection data, and sends the streaming media to the host vehicle for presentation.

In various embodiments, the media streaming module, when executed by the processing unit, obtains the streaming media based on the user-selection data, obtains the streaming media from a remote server.

In various implementations, a long-range wireless transceiver configured to communicate with a communication network beyond the vehicle, wherein the media streaming module, when executed by the processing unit to obtain the streaming media based on the user-selection data, obtains the streaming media from a remote server by way of the long-range wireless transceiver and the communication network.

In various embodiments, the portable communication device is a primary portable communication device; the primary portable communication device comprises a short-range wireless transceiver configured to communicate with a secondary portable communication device; and the media streaming module, when executed by the processing unit to obtain the streaming media based on the user-selection data, communicates with the secondary add-on device to obtain the streaming media from the secondary add-on device.

In various implementations, the host vehicle includes a long-range communication transceiver; and the media streaming module, when executed by the processing unit to obtain the streaming media based on the user-selection data, communicates with the host vehicle to obtain the streaming media from a remote server by way of the long-range communication transceiver of the host vehicle.

In various embodiments, the streaming media includes video media.

In various embodiments, the portable communication device is a primary portable communication device; the primary portable communication device comprises a short-range wireless transceiver configured to communicate with a secondary portable communication device; and the media streaming module, when executed by the processing unit to send the streaming media to the host vehicle for presentation, sends the streaming media to the secondary add-on device for sending to the host vehicle for presentation.

In implementations, the portable communication device includes a hardware sensor configured to sense user input; an audio source module that, when executed by the processing unit, obtains user-input data from the hardware sensor; and an activity module that, when executed by the processing unit, initiates an action in response to the user-input data obtained.

In various embodiments, the action includes sending the user-input data to the host vehicle.

In various implementations, the add-on device further includes an analog-to-digital conversion module; wherein the action includes converting the user-input data to digital format for further processor or use at the portable communication device and/or at the host vehicle.

In various embodiments, the further processing includes quantification or packetization of the user-input data.

In various use cases, the add-on device includes a streaming media application, wherein the media streaming module comprises, is a part of, or is in communication with the streaming media application.

In various embodiments, the media streaming module, when executed, sends the streaming media to the host vehicle for presentation by way of the on-board diagnostic connector of the portable communication device and the on-board diagnostic port of the host vehicle.

In another aspect, a portable communication device is for implementation with an add-on on-board diagnostic device and a host vehicle of transportation having an on-board diagnostics port and a limited-access head-unit display. The device includes a short-range wireless transceiver; a hardware-based processing unit in communication with the short-range wireless transceiver; and a non-transitory storage device in communication with the processing unit. The storage device includes a media streaming module that, when executed by the processing unit: obtains media-selection data from the add-on on-board diagnostic device; obtains, from a remote source, based on the media-selection data, streaming media; and sends the streaming media obtained for presentation at the host vehicle.

In various embodiments, the media streaming module, when executed to send the streaming media obtained for presentation at the host vehicle, sends the streaming media obtained to the host vehicle by way of the on-board add-on device.

The host vehicle in various embodiments includes a long-range transceiver, such as an LTE transceiver, and the media streaming module, in obtaining the streaming media, obtains the streaming media by way of the long-range transceiver of the host vehicle.

Other aspects of the present invention will be in part apparent and in part pointed out hereinafter.

DESCRIPTION OF THE DRAWINGS

FIG. 5 illustrates operations of an algorithm involving a primary add-on device in the form of an on-board diagnostics device having a long-range transceiver.

FIG. 6 illustrates operations of an algorithm involving a primary add-on device and a secondary add-on device, using a long-range transceiver of the vehicle.

FIG. 7 illustrates operations of an algorithm performed by another add-on device, such as a USB add-on device, without the need to connect to a vehicle OBD port.

The figures are not necessarily to scale and some features may be exaggerated or minimized, such as to show details of particular components.

The invention, including as recited in the claims, is not limited to the example embodiments shown.

In some instances, well-known components, systems, materials or methods have not been described in detail in order to avoid obscuring the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model, or pattern.

Specific structural and functional details disclosed herein are not to be interpreted as limiting, but merely as a basis for the claims and as a representative basis for teaching one skilled in the art to employ the present disclosure.

While select embodiments of the present technology are described in connection with automobiles, the technology is not limited to automobiles. The concepts can be used in a wide variety of applications, such as in connection with aircraft and marine craft, and non-transportation industries such as with televisions.

Other implementations are not limited to automotive applications, and can include plug-in peer-to-peer, or network-attached-storage (NAS) devices, for instance.

I. Example Host and Add-On Devices—FIG. 1

Figure 1:
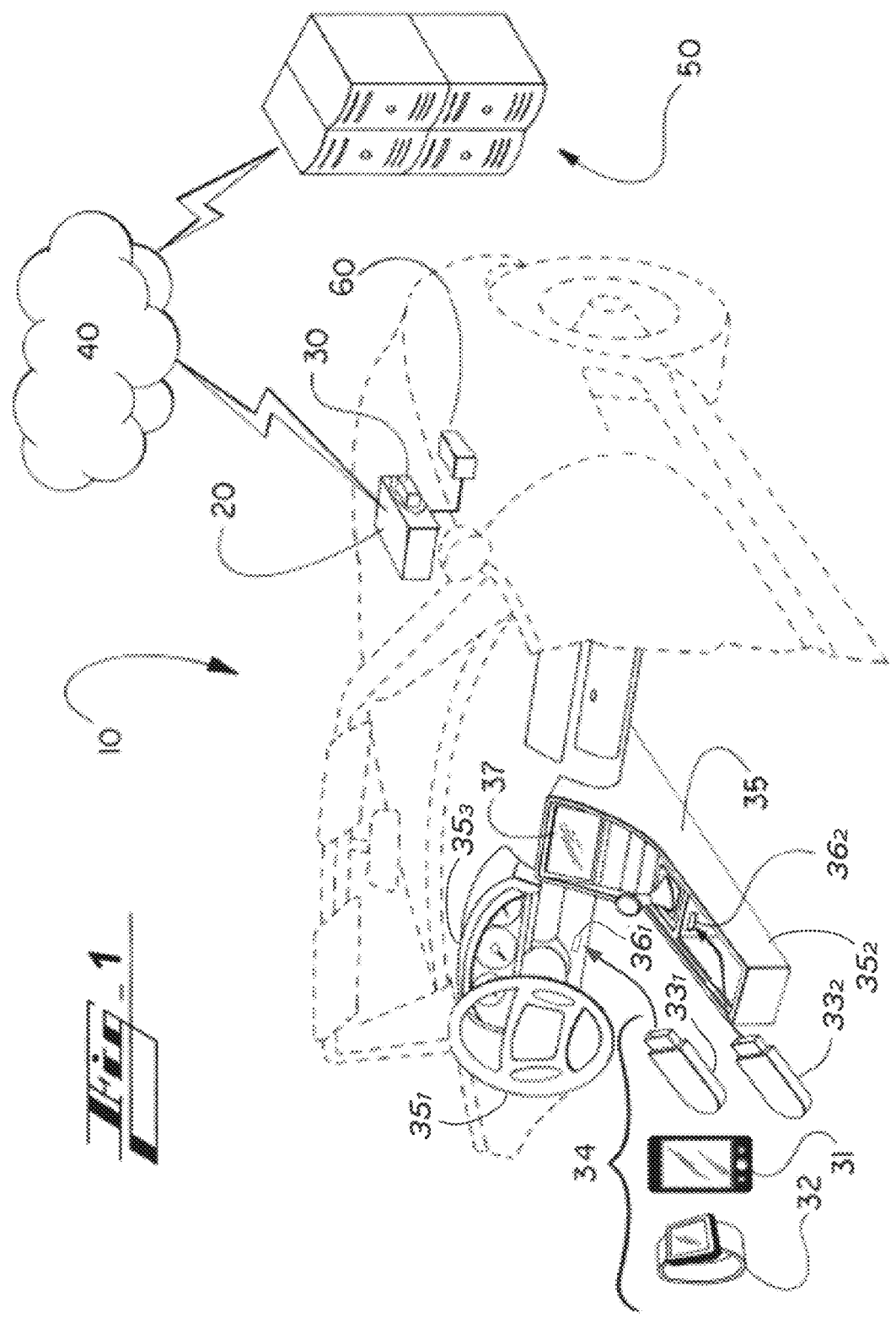
FIG. 1 illustrates schematically an example vehicular environment in which the present technology is implemented, including example add-on devices.

Turning now to the figures and more particularly to the first figure, FIG. 1 shows a host structure or apparatus 10 in the form, by way of example, of a vehicle.

The host apparatus 10 includes a hardware-based computing controller, or controller system 20. The hardware-based controller system 20 includes a communication subsystem 30 capable in various embodiments of communicating with add-on computing devices 34 and external networks 40.

While the devices 34 are referred to as add-on computing or communication devices, or simply add-on devices, herein, the term encompasses a wide variety of potential devices and terminology for same, such as peripherals, plug-in devices, streaming device, user devices, mobile devices, portable devices, local devices, the like, and other.

Example external networks 40 include the Internet, a local-area, cellular, or satellite network, vehicle-to-vehicle, pedestrian-to-vehicle, road-side infrastructure networks, and local networks such as by way of a roadside-infrastructure or other local wireless transceiver, beacon, or hotspot.

By the external networks 40, the host apparatus 10 and/or add-on devices having long-range transceivers other local apparatus or remote systems 50, such as a remote infotainment server, media server, or other remote computer(s).

The remote system 50 may be a server, and may be a part of, or operated by, a customer-service center or system, such as the OnStar® system (ONSTAR is a registered trademark of Onstar LLC of Detroit, Mich.).

Add-on computing devices 34 include at least one portable interface device, or PID, 33, reference 33 indicating both of a first and a second example PID $33_1$, $33_2$. The portable interface device(s) 33 can each be a plug-in and/or wireless device. Though the portable interface devices 33 are described primarily herein as USB and OBD devices, and shown with a stick-like configuration in FIG. 1, the devices 33 can have any suitable form factor and configuration, such as by being one of the other mentioned add-on devices 34. For instance, a user wearable or phone may perform the functions described herein for the portable interface devices 33.

In various embodiments, the first example add-on device 33 is an onboard diagnostic (OBD) device $33_1$. The term OBD is not used to limit the particular type of diagnostics port for which the device 34 can be configured to communicate. For instance, the OBD add-on device $33_1$ is not limited to being configured for use with automobiles, or even transportation systems, but can be configured to connect to the diagnostic port of marine craft or other host systems.

The OBD is in various embodiments configured to connect with an OBD port $36_1$ of the vehicle 10, such as a 16-pin diagnostics port. In vehicles, such a diagnostic port $36_1$ is typically positioned beneath the steering wheel. In various embodiments, the OBD device $33_2$ is configured to connect and communicate with the vehicle controller system 20 wirelessly and/or by way of a plug-in connection, such as the 16-pin port. The wireless communications can be affected via any suitable protocol, such as WiFi, Bluetooth, ZigBee, or other.

Any add-on device can be configured to connect to a power source, such as a vehicle cigar lighter receptacle. For wireless add-on-devices, the add-on device may be configured to perform functions of the present technology (e.g., presenting media options to the user via the vehicle heads-up display) while being in communication with the power source. Or the add-on device can connect to the power source at least for being charged.

A second example portable interface device 33 or add-on device is a USB class (e.g., mass-storage-protocol, MTP, PTP) device $33_2$. In various embodiments, the USB device $33_2$ is configured to connect to and communicate with the vehicle controller system 20 wirelessly and/or by way of a plug-in connection, such as a standard USB port $36_2$ of the vehicle 10.

The wireless communications can be affected via any suitable protocol, such as Bluetooth (BT), Bluetooth Low Energy (BLE), ZigBee (ZB), wireless USB, or other. While referred to primarily herein as a USB device, the second example portable interface device $33_2$ is not limited in every embodiment, despite the reference, to being configured with a USB format or protocol. A wireless BT or ZigBee second device $33_2$ need not be configured as such, for instance, and can be configured for an HDMI vehicle port, or to connect to another vehicle interface.

While referred to primarily herein as a USB device, the second example portable interface device $33_2$ is not limited for every embodiment, despite the reference, to being configured to plug-into a OBD port, or have and OBD-related format or protocol. A wireless BT or ZB second device $33_2$ need not be configured as such, for instance.

The first PID, second PID, or other add-on devices 34 can be, be part of, or include a user smartphone 31 or a wearable device 32, such as a smart watch or smart eye glasses.

The host apparatus 10 also has various mounting structures 35.

The mounting structures also include a dashboard and an instrument panel $35_3$. Structures such as buttons, knobs, and even ports such as USB ports could also be positioned on a steering column or wheel $35_1$.

The mounting structures 35 also include a central console or center stack $35_2$, the center console being generally the lower area, shown in the example vehicle, of FIG. 1, from about the gearshift, back, and the center stack being from there, forward and up in the example vehicle. The center console and center stack are referred to in various ways in vehicle industries—they may be viewed as a single area and referred to by either name—center console or center stack, for example. And the central mounting structure(s) can also be part of or referred to as the dashboard.

The mounting structure 35 includes or holds at least one plug-in port 36, such as the two ports $36_1$, $36_2$ mentioned. Each port is connected to or at least in communication with the vehicle controller system 20. An example port is a USB port, shown by way of example in a compartment of the center stack $35_2$ in FIG. 1. Another example port is an OBD or similar port, shown by way of example beneath the steering column.

The vehicle controller system 20, OBD port 36, and OBD device $33_1$ are in various embodiments configured so that the controller system 20 can communicate with the OBD device 36 via a controller area network (CAN) and/or Ethernet connection. The CAN message-based protocol is typically designed for multiplex electrical wiring with automobiles, and CAN infrastructure may include a CAN bus. The OBD can also be referred to as vehicle CAN interface (VCI) components or products, and the signals transferred by the CAN may be referred to as CAN signals. Communications between the OBD(s) and the primary controller or microcontroller 20 are in other embodiments executed via similar or other message-based protocol. CAN/Ethernet message-based protocols are typically designed for multiplex electrical wiring with automobiles, and CAN/ETHERNET infrastructure may include a CAN/ETHERNET bus. The OBD can also be referred to as vehicle CAN/ETHERNET interface (VCI, VEI, etc.) components or products, and the signals transferred by the CAN/ETHERNET may be referred to as CAN/ETHERNET signals.

Communications between the OBD(s) and the primary controller or microcontroller 20 are in other embodiments executed via similar or other message-based protocol.

The vehicle 10 includes any of a wide variety of output components, including communication components, for communication with a user or external device. Example user-interface devices includes audio speakers and display screens. As an example, the mounting structure holds a visual display 37, which may be a touch-sensitive human-machine interface (HMI), and/or controllable by other in-vehicle control interfaces.

Output at the host apparatus 10 includes information received from one or more add-on devices 34, such as the two example portable interface devices mentioned: the OBD device $33_1$ and/or the USB device $33_2$.

The host apparatus 10 also has a sensor sub-system 60 including sensors providing information to the controller 20. Sensors may be configured to measure user output, such as user speech, touches (swipes, etc.), gestures, user characteristics, such as biometrics or physiological measures, and environmental-characteristics pertaining to a vehicle interior or outside of the host apparatus 10.

Example sensors include microphones, cameras, touch-sensitive screens, range sensors, barometric sensors, altimeters, vehicle weight or height sensors, interior and exterior climate sensor, the like and other.

In various embodiments, any add-on device can function also as a sensor of the sub-system 60, such as in embodiments in which the host apparatus 10 uses data provided by the local device based on output of a local-device sensor(s). The vehicle system can use data from a user smartphone, for instance, indicating user-physiological data sensed by a biometric sensor of the phone.

II. Select Components of Add-On Devices and Host—FIG. 2

Figure 2:
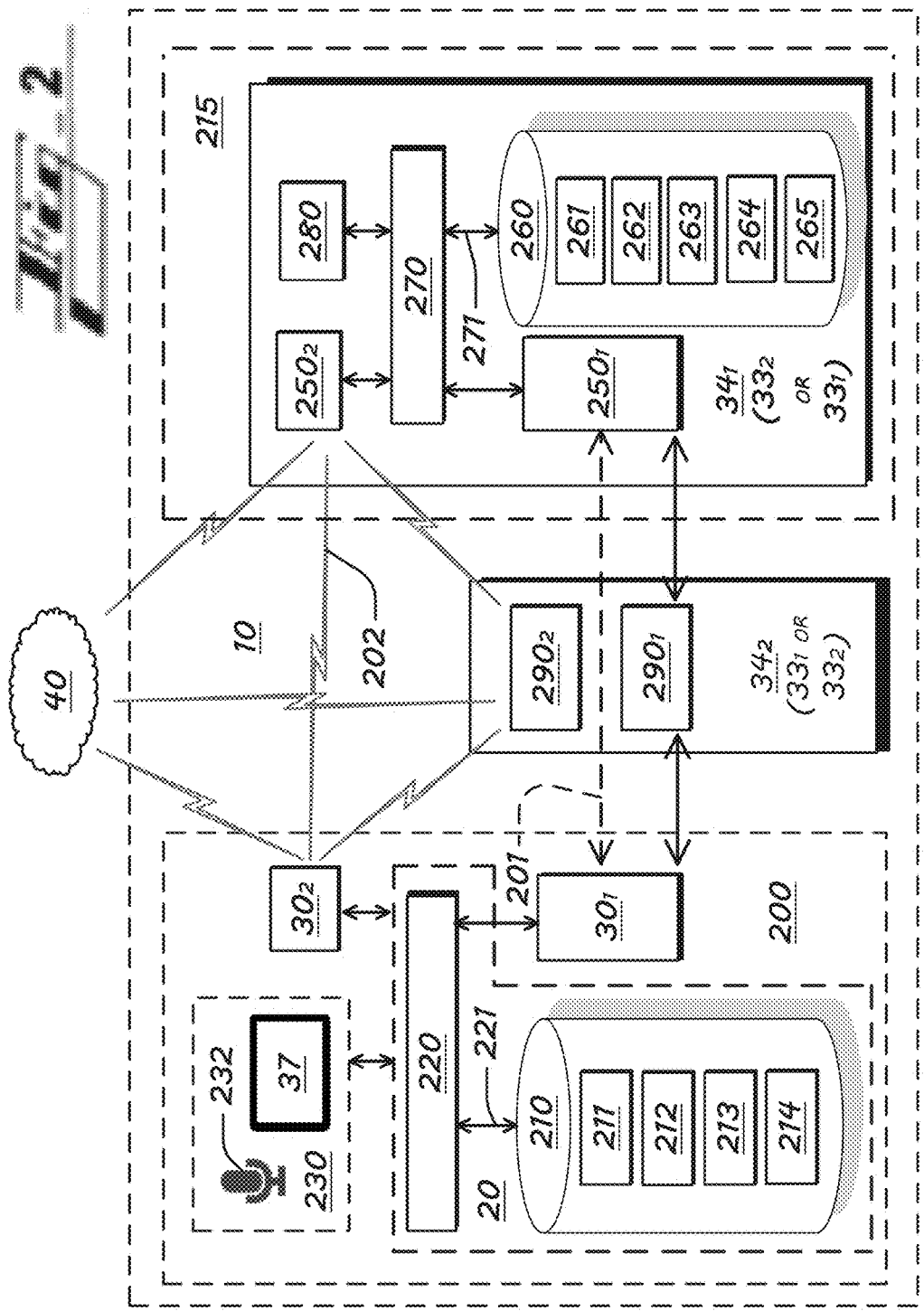
FIG. 2 illustrates select components of the arrangement of FIG. 1 according to various embodiments of the technology.

FIG. 2 shows a schematic view of select components of the arrangement of FIG. 1 according to various embodiments of the technology.

The view indicates select computing, communicating, and sensing (CCS) components of the vehicle 10 by reference numeral 200, at left. At right, the view shows a primary add-on device $34_1$. The primary add-on device $34_1$ is, in various embodiments, the mentioned OBD portable interface device $33_1$, and in other embodiments, is the mentioned USB portable interface device $33_2$.

The terms primary and secondary are used for purposes of describing the two devices $34_1$, $34_2$ in the present disclosure, and do not limit the configuration or functions of the devices $34_1$, $34_2$. Either can perform any of the functions described herein for the devices $34_1$, $34_2$. Similar terms, such as first and second, may be used to describe the same devices in the specification or claims.

II.A. Example Host System Components

The computing, communicating, sensing (CCS) components 200 of the host, vehicle 10 include a hardware-based memory or computer-readable storage device 210, such as volatile medium, non-volatile medium, removable medium, and non-removable medium. The term computer-readable media and variants thereof, as used in the specification and claims, refer to tangible or non-transitory, computer-readable storage devices. The component is referred to primarily herein as a storage device 210.

The CCS components 200 of the vehicle 10, including vehicle-user interfaces 202, and the vehicle controller system 20 and the communication sub-system 30 of FIG. 1. The interfaces 202 include, for instance, a visual interface, such as a display screen 37, or other visual input/output device, and an audio interface 212, such as a microphone and/or speaker.

In some embodiments, the storage device 210 includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The host, vehicle controller 20 also includes an embedded computer hardware-based processing unit 220 connected or connectable to the storage device 210 by way of a communication link 221, such as a computer bus.

The hardware-based processing unit 220 could be multiple processors, which could include distributed processors or parallel processors in a single machine or multiple machines. The hardware-based processing unit can be used in supporting a virtual processing environment. The hardware-based processing unit could include a state machine, application specific integrated circuit (ASIC), programmable gate array (PGA) including a Field PGA, or state machine. References herein to hardware-based processing unit executing code or instructions to perform operations, acts, tasks, functions, steps, or the like, could include the hardware-based processing unit 240 performing the operations directly and/or facilitating, directing, or cooperating with another device or component to perform the operations.

The storage device 210 in various embodiments stores at least some of the data received and/or generated, and to be used in processing, in a file-based arrangement corresponding to the code stored therein. For instance, when an FPGA is used, the hardware storage device 260 can include configuration files configured for processing by the FPGA.

The storage device 210 includes computer-executable instructions, or code. The computer-executable code is executable by the hardware-based processing unit 220 to cause the hardware-based processing unit, and thus the host, vehicle controller 20, to perform any combination of the functions described in the present disclosure regarding the host, vehicle controller 20.

The storage device 210 of the host, vehicle controller 20 in various embodiments also includes any of: other code or data structures, such as a file sub-system; and a dynamic-programming-language (e.g., Python, JavaScript, Java or a C/C++ programming language—not shown in detail in the figures).

Any such storage device 210 components may be combined, separated, or removed. References herein to host system operations performed in response to execution of any storage device 210 component can be performed by execution of another, or a combined or separated, memory component. For instance, if first code is described as being configured to cause the hardware-based processing unit 220 to perform a certain operation or set of operation(s), other code, including or fully distinct form the first code, can be configured to cause the hardware-based processing unit 220 to perform the operation(s).

The file sub-system can include a first level cache and a second level cache. The file sub-system can be used to store media, such as video or image files, before the hardware-based processing unit 220 publishes the file(s).

The storage device 210 of the host, vehicle controller 20 in various embodiments includes an application(s) framework or module, an audio-media module, a framebuffer or visual-media module, and a HMI module.

The dynamic-programming-language (e.g., JavaScript, Java or a C/C++ programming language (not shown in detail) and/or application framework can be part of the second level cache. The app framework is referenced by numeral 213 and, alternatively by numeral 409 in FIG. 4.

The dynamic-programming-language is used to process media data, such as image or video data, received from the add-on device(s) $34_1$, $34_2$ and or other apparatus such as the remote server 50. The programming language code can define settings for communications between the add-on device(s) and the host, vehicle controller 20, such as characteristics of one or more APIs.

As referenced, the host, vehicle controller 20 includes or is in communication with one or more interface components 230, such as an HMI component. For implementations in which the components 230 facilitate user input to the hardware-based processing unit 220 and output from the hardware-based processing unit 220 to the user, the components can be referred to as input/output (I/O) components.

For output, the interface components can include the visual-output or display component 37, such as a screen, and an audio output such as a speaker. In a contemplated embodiment, the interface components 230 include components for providing tactile output, such as a vibration to be sensed by a user, such as by way of a steering wheel or vehicle seat to be sensed by an automobile driver.

The interface components 230 are configured in any of a variety of ways to receive user input. The interface components 230 can include for input to the host, vehicle controller 20, for instance, a mechanical or electro-mechanical sensor device such as a touch-sensitive display, which can be referenced by numeral 37 and/or an audio device 232, such as an audio sensor—e.g., microphone—or audio output such as a speaker. In various implementations, the interface components 230 includes at least one sensor. The sensor is configured to detect user input provided by, for instance, touch, audibly, and/or by user non-touch motion, such as by gesture.

A touch-sensitive interface component can include a mechanical actuator, for translating mechanical motion of a moving part such as a mechanical button, to an electrical or digital signal. The touch sensor can also include a touch-sensitive pad or screen, such as a surface-capacitance sensor. For detecting gestures, an interface component 230 can use a projected-capacitance sensor, an infrared laser sub-system, a radar sub-system, or a camera sub-system, for example.

The interface component 230 can be used to receive user input for affecting functions and settings of one or both of the add-on device(s) $34_1$, $34_2$, and the host, vehicle controller 20. Signals or messages corresponding to inputs are generated at the component 230 and passed to the hardware-based processing unit 220, which, executing code of the storage device 210, sets or alters a function or setting at the host, vehicle controller 20, or generates a communication for the add-on device(s) $34_1$, $34_2$, such as an instruction or message, and sends the communication to the add-on devices $34_1$, $34_2$ for setting or altering a function or setting of the add-on devices $34_1$, $34_2$.

The host, vehicle controller 20 is in various embodiments configured to connect to the add-on device(s) $34_1$, $34_2$ by the wired connection 201. In some embodiments, the connection is configured with connections for higher throughput, such as using an HDMI port or a VGA port.

The host, vehicle controller 20 is in a particular embodiment configured with or connected to a data-communications port (which can be considered illustrated also by reference numeral $30_1$) matching the data-communications plug (which can be considered illustrated also by reference numeral $250_1$, $290_1$) of the add-on device(s) $34_1$, $34_2$. Wireless USB protocol may also be used to connect any of the vehicle CCS components 200, the primary add-on device $34_1$, and the secondary add-on device $34_2$.

In various embodiments, the host, vehicle controller 20 is configured for wireless communications with the add-on device(s), and with remote networks and system 40, 50. The communication sub-system 30 includes one or both of a wired, plug-in, or otherwise physical-connection interface $30_1$ and a wireless transceiver $30_2$ for communicating with the primary add-on device $34_1$ and/or the secondary add-on device $34_2$, the remote network 40, and remote systems 50 (remote systems shown in FIG. 1). The reference $30_1$ can also be considered to refer to connection structure, such as the one or more ports into which the add-on devices $34_1$, $34_2$ are plugged in for operation of the system.

The wireless apparatus $30_2$ in various embodiments is configured to communicate with any of a wide variety of networks, including cellular communication networks, satellite networks, and local networks such as by way of a roadside-infrastructure or other local wireless transceiver, beacon, or hotspot. The wireless apparatus $30_2$ can include, for example, a radio modem for communication with cellular communication networks. The wireless apparatus $30_2$ may include, for instance, cellular transceiver configured according to the 3G, Long-Term Evolution (LTE), or other mobile telecommunication or data communication standard or policy.

Structures of the hardware storage device 210 in various embodiments include at least any of the following:
 an operating-system module 211;
 a communications-interface module 212, for wireless and/or wired communications for the host, vehicle 10;
 an application (app) framework module 213, which may include one or more streaming apps; and
 other-streaming-and-communication (OSC) module 214.

The operating system module 211 includes any suitable operating system for the vehicle 10. Example operating systems include Linux®, Android®, and iOS® (LINUX, ANDROID, and IOS are registered trademarks of William R. Della Croce Jr., Google, Inc., and Cisco Technology, Inc., respectively). The vehicle CCS components 200 may also include one or more apps, such as a streaming app, and any related plug-ins, or be configured to communicate with the same or related apps at the add-on device(s) $34_1$, $34_2$.

The communication module 212 in various embodiments includes code for affecting wireless communications to and from the vehicle 10, using the wireless apparatus $30_2$. The module 212 may be configured to facilitate communications to/from more than one wireless apparatus $30_2$—e.g., communication transmitter, receiver, or transceiver—and may include more than one module, or one or more sub-modules for affecting wireless communications involving the vehicle 10.

The communication module 212 may also include components for facilitating, controlling, managing, or otherwise affecting physical-interface communications, such as any suitable code for affecting wired communications to and from the vehicle 10, using at least one physical-connection communication apparatus $30_1$.

The app framework module 213 includes one or more apps loaded to the vehicle CCS components 200. The apps can be configured to serve any of various purposes, including the purpose of obtaining media, such as audio (music, podcasts, etc.) or visual (e.g., video), and delivering the media to the vehicle 10. The module 213 may facilitate obtaining the media from local or remote sources, such as the add-on devices $34_1$, $34_2$, as well as directly from a remote source, such as a remote server 50. Obtaining the media may be accomplished by a direct connection between the vehicle CCS components 200 and the add-on device $34_1$ (which may have received the media data from a communication network 40). Or the vehicle components 200 may receive media data from the primary add-on device $34_1$ indirectly, by way of the secondary add-on device $34_2$.

The app framework 213 can be part of or include a mentioned dynamic-programming-language (e.g., JavaScript, Java or a C/C++ programming language (not shown in detail) and/or application framework can be part of the second level cache.

Example components of the app framework 213 include music streaming apps such as Pandora® and Spotify® (PANDORA AND SPOTIFY are registered trademarks of Pandora Media, Inc. and Spotify Technology Holding, respectively) and video streaming apps such as YouTube and Netflix (YOUTUBE AND NETFLIX are registered trademarks of Google Inc. and NetFlix.com, Inc., respectively).

Figure 4:
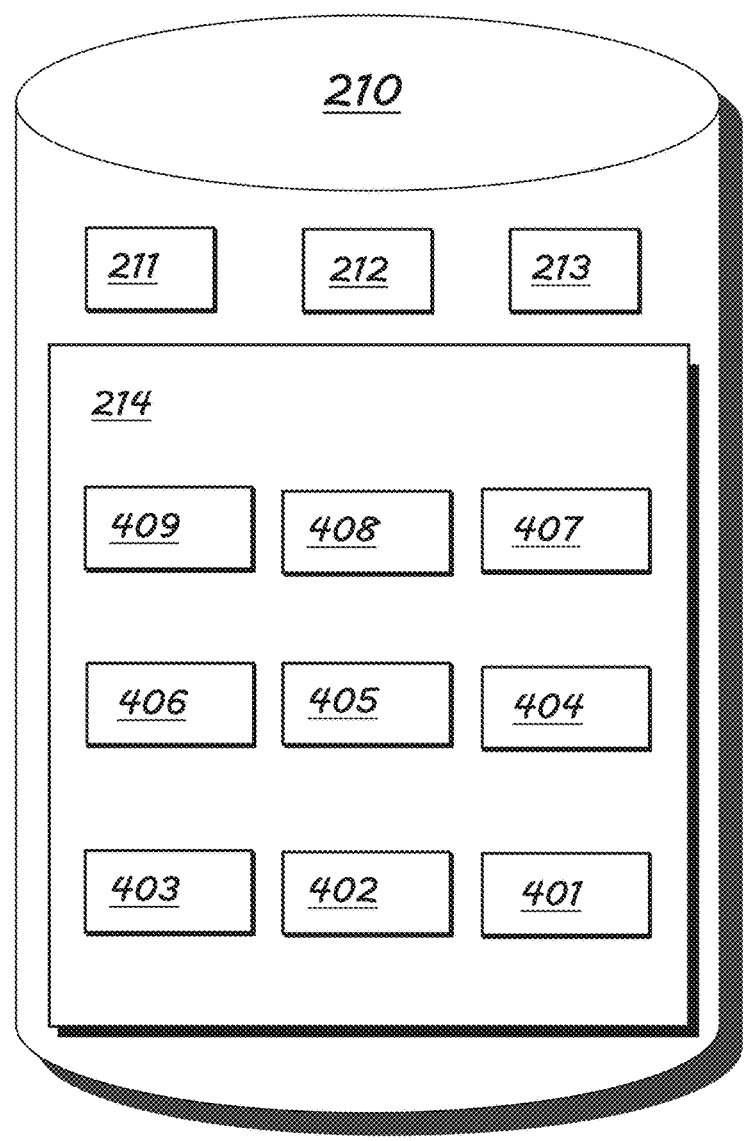
FIG. 4 illustrates further detail regarding components of a hardware storage device of a host, vehicle system of FIG. 2.

The host OSC module 214 includes any of a wide variety of components for facilitating intra-vehicle communications and/or effective streaming and communications to or from the primary and/or secondary devices $34_1$, $34_2$. The module 214 can represent various modules or sub-modules, which are shown by FIG. 4. The host OSC module 214 in various embodiments may not be a module, per se, but a manner of representing or grouping various constituent modules (e.g., modules 401, 402, etc., of FIG. 4) for purposes of the present disclosure.

II.B. Example Components of the Add-On Device or Devices

FIG. 2 shows, as mentioned, a primary add-on device $34_1$, which can be an OBD portable interface device $33_1$, and a secondary add-on device $34_2$, which can be a USB portable interface device $33_2$. The terms primary and secondary are used for description purposes, and either device $34_1$, $34_2$ can perform any of the functions described herein for the devices $34_1$, $34_2$.

The primary add-on device $34_1$ may be configured and arranged to communicate directly or indirectly with the vehicle 10, with extra-vehicle networks 40 and systems 50, as well as with other add-on or local devices 34.

The configurations include at least one suitable communication structure to communicate with any or all of the vehicle 10, extra-vehicle networks 40 and systems 50, and one or more other add-on or local devices 34. Example communication structure includes physical-connection apparatus $250_1$, which may include a wired, plug, port, or other physical structure and/or at least one wireless apparatus $250_2$ (e.g., transceiver).

Direct wired communication between the primary add-on device and the vehicle 10 are indicated by dashed, arrowed line 201. Direct wireless communications between the two are indicated by wireless reference 202 connecting them.

The wireless apparatus $250_2$ can include, for example, a radio modem for communication with cellular communication networks. The wireless apparatus $250_2$ may include, for instance, a cellular transceiver configured according to the 3G, Long-Term Evolution (LTE), or other mobile telecommunication or data communication standard or policy.

For embodiments in which the primary add-on device $34_1$ does not include a needed long-range transceiver, but the vehicle or the secondary add-on device $34_2$ does—having, e.g., an LTE transceiver—the primary add-on device $34_1$ can communicate to long-range networks and systems 50 via the secondary add-on device and/or the vehicle 10 in those embodiments.

The wireless apparatus $250_2$ can also communicate with near-field communication (NFC) devices, ZigBee devices, the like or other, to support functions such as mobile payment processing, sharing of user health information or biometrics, communication setup/handover functions, or any other use cases that are enabled by wireless communications NFC.

In various embodiments, as described further below, the primary add-on device $34_1$ communicates indirectly, by way of a secondary add-on device $34_2$. As referenced, for embodiments in which the first device $34_1$ is an OBD device $33_1$, the second device $33_3$ may be a USB device $33_2$. And, conversely, for embodiments in which the first device $34_1$ is the USB device $33_2$, the second device $33_3$ may be the OBD device $33_1$.

For wireless communications, the secondary add-on device $34_2$ includes a wireless transceiver $290_2$. For wired communications, or communication by physical connection, the secondary add-on device $34_2$ includes suitable structure $290_1$, such as a plug or port component for physical connection with the physical-connection interface $30_1$ of the vehicle 10 and/or the physical-connection communication apparatus $250_1$ of the primary add-on device $34_1$. The reference $290_1$ can also be considered to refer to connection structure, such as the plug of the second add-on device $33_2$, for connecting the second add-on device $33_2$ to the port $30_2$ of the host, vehicle CCS components 200, in operation of the system.

Although connections are not shown between all of the components illustrated in FIG. 2, intra-device and inter-device, any of the components can be configured to interact, by wire or wirelessly, with each other to carry out functions of the arrangement.

The add-on devices 34 can be referred to as being add-on, portable, or the like based on any of a variety of reasons, such as by being readily attachable/removable to/from the vehicle 10, such as by a plug-in arrangement, and/or by being mobile, such as by being wireless and compact for being readily carried about by a user. The add-on or portable device(s) can be, include, or be a part of another apparatus 255 such as dongle or a mobile communications device such as a smart phone.

In various embodiments, instead of being readily portable, the add-on device(s) is embedded in or connected to the vehicle, such as by an after-market installation.

Computing components of the add-on devices 34 are now described. While components of the primary add-on device $34_1$ are illustrated, the secondary add-on device $34_2$ can include any of the same structure and functions. For instance, while a hardware storage component 260 of the primary add-on device, and units or modules thereof, are shown and described below, the same showing and description can be applied to the secondary add-on device $34_2$, whereby the secondary device $34_2$ can include the same or similar hardware-based storage component 260, and the same or similar units or modules thereof.

The hardware-based storage device 260 can be referred to by other terms, such as a hardware storage device, memory, or computer-readable medium, and can include, e.g., volatile medium, non-volatile medium, removable medium, and non-removable medium. The term hardware storage device and variants thereof, as used in the specification and claims, refer to tangible or non-transitory, computer-readable storage devices. The component is referred to primarily herein as a hardware-based storage device 260.

In some embodiments, the hardware-based storage device 260 includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

Any of the components of the hardware storage device 260 may be combined, separated, or removed. References herein to portable-system operations performed in response to execution of any memory 112 component can be performed by execution of another, or a combined or separated, memory 260 component. For instance, if instructions of a first component of code is described as being configured to cause the processing hardware unit 270 to perform a certain operation or set of operations, instructions of another component of the storage device 260, including or fully distinct from the first code, can be configured to cause the processing hardware unit 270 to perform the operation(s).

In some embodiments, the hardware storage device 260 includes code of a dynamic programming language (not called out in detail in the drawings), such as JavaScript, Java or a C/C++ programming language. The host, vehicle controller 20 in those embodiments may include the same programming language. The programming-language component of the host system 10, in some implementations includes an application framework, such as the media application mentioned and/or an application manager for managing operations of the media application at the host, vehicle controller 20. The app framework at the vehicle 10 is indicated by reference numeral 213 and, alternatively 409 in FIG. 4.

The programming language code can define settings for communications between the add-on device(s) $34_1$, $34_2$, and the host, vehicle controller 20, such as features of one or more application program interfaces (APIs) by which the add-on devices and the host controller 20 communicate.

The primary add-on device $34_1$ also includes a processing hardware unit 270 connected or connectable to the hardware storage device 260 by way of a communication link 271, such as a computer bus.

The processing hardware unit 270 can be referred to by other terms, such as processing hardware unit, processing hardware device, processing hardware system, processing unit, processing device, or the like.

The processing hardware unit 270 could be multiple processors, which could include distributed processors or parallel processors in a single machine or multiple machines. The processing hardware unit 270 can be used in supporting a virtual processing environment.

The processing hardware unit 270 can include or be a multicore unit, such as a multicore digital signal processor (DSP) unit or multicore graphics processing unit (GPU).

The processing hardware unit 270 can be used in supporting a virtual processing environment. The processing hardware unit 270 could include a state machine, application specific integrated circuit (ASIC), programmable gate array (PGA) including a Field PGA (FPGA), DSP, GPU, or state machine.

The primary add-on device $34_1$ in various embodiments comprises one or more complimenting media codec components, such as a processing or hardware component, and a software component to be used in the processing. The hardware or processing component can be a part of the processing device 270.

References herein to a processor or processing hardware unit 270 executing code or instructions to perform operations, acts, tasks, functions, steps, or the like, could include the unit 270 performing the operations directly and/or facilitating, directing, or cooperating with another device or component to perform the operations.

The hardware storage device 260 includes structures such as modules, engines, units, and components, which include computer-executable instructions or code for performing functions of the present technology. the modules, engines, and components are each referred to primarily herein as modules.

Code, whether part of the modules, is executed by the processing hardware unit 270 to cause the processing hardware unit and thus the primary add-on device $34_1$ to perform any combination of the functions described herein regarding the primary add-on device $34_1$.

Each of the modules (or engines, units, etc.) and sub-modules (or sub-units, etc.) can be referred to by any of a variety of names, such as by a term or phrase indicative of its function.

Structures of the hardware storage device 260 in various embodiments include at least any of the following:

an operating-system module 261;
a wireless-interface module 262;
a physical-interface module 263;
a media streaming application (app) or module 264; and
other-streaming-and-communication (OSC) module or grouping 265.

The operating system module 261 includes any suitable operating system for the add-on device $34_1$. Example operating systems include Linux®, Android®, and iOS® (LINUX, ANDROID, and IOS are registered trademarks of William R. Della Croce Jr., Google, Inc., and Cisco Technology, Inc., respectively). The add-on device $34_1$ may also include one or more apps, such as a streaming app, and any related plug-ins, or be configured to communicate with the same or related apps at the host system controller 20.

The wireless-interface module 262 includes code for affecting wireless communications to and from the add-on device $34_1$, using the wireless apparatus $250_2$. The module 262 may be configured to facilitate communications to/from more than one wireless apparatus $250_2$—e.g., communication transmitter, receiver, or transceiver—and may include more than one module, or one or more sub-modules for affecting wireless communications involving the add-on device $34_1$.

The physical-interface module 263 includes any suitable code for affecting wired communications to and from the add-on device $34_1$, using the physical-connection communication apparatus $250_1$.

The media streaming app or module 264 includes one or more apps loaded onto the add-on device $34_1$. The apps can be configured to serve any of various purposes, including the purpose of obtaining media, such as audio (music, podcasts, etc.) or visual (e.g., video), and delivering the media to the vehicle. The module 264 may facilitate obtaining the media from local or remote sources, such as the remote server 50.

Obtaining the media may be accomplished by a direct connection between the add-on device $34_1$ and communication network 40, or by way of the secondary add-on device $34_2$ and/or the vehicle 10.

Example components of the media streaming module 264 include music streaming apps such as Pandora® and Spotify® (PANDORA AND SPOTIFY are registered trademarks of Pandora Media, Inc. and Spotify Technology Holding, respectively) and video streaming apps such as YouTube and Netflix (YouTube AND NETFLIX are registered trademarks of Google Inc. and NetFlix.com, Inc., respectively).

The OSC module or grouping 265 includes any of a wide variety of components for facilitating intra-device communications and/or effective streaming and communications to or from the secondary device $34_2$ and/or the vehicle CCS components 200.

The OSC module 265 in various embodiments may not be a module per se, but a manner of representing or grouping various constituent modules (e.g., modules 301, 302, etc., of FIG. 3) for purposes of the present disclosure.

The primary add-on device $34_1$ in various embodiments also includes at least one human-machine interface (HMI) component 280.

For implementations in which the interface component 280 facilitates user input to the processing hardware unit 270 and/or output from the processing hardware unit 270 to the user, the interface component 280 can be referred to as an input/output (I/O) component.

As examples, the interface component 280 can include, or be connected to, a sensor configured in any of a variety of ways to receive user input. In various implementations the interface component 280 includes at least one sensor configured to detect user input provided by, for instance, a touch, an audible sound or a non-touch motion or gesture.

A touch-sensor interface component can include a mechanical actuator, for translating mechanical motion of a moving part such as a mechanical knob or button, to an electrical or digital signal. The touch sensor can also include a touch-sensitive pad or screen, such as a surface-capacitance sensor. The sensor can also include infrared components of a touch-sensor interface, as well.

For detecting gestures, the interface component 280 can include or use a projected-capacitance sensor, an infrared laser sub-system, a radar sub-system, or a camera sub-system, by way of examples.

The interface component 280 is connected to the processing hardware unit 270 for sending user input received to the hardware-based processing unit.

In various implementations, the interface component 280 includes or is connected to any suitable output devices—for example, a visual or audible indicator such as a light output, a digital display, or a tone generator, for communicating output to the user.

The interface component 280 can be used to affect functions and settings of one or more other apparatus. Example other apparatus include the primary add-on device $34_1$, the secondary add-on device $34_2$, the vehicle computing system 20, and remote networks and systems 40, 50.

Signals or messages corresponding to inputs received by the interface component 280 are transferred to the processing hardware unit 270, which, executing code of the hardware storage device 26, creates or adjusts a setting or function of the primary add-on device $34_1$, or generates a communication to create or adjust a setting or function of another device. The communication can include be sent, for instance, to the secondary add-on device $34_2$, the vehicle system 20, and remote servers 50. Example functions to change include media playback functions, affecting how streaming media is processed or presented to the user.

III. Additional Detail of Hardware Storage Device—FIG. 3

Figure 3:
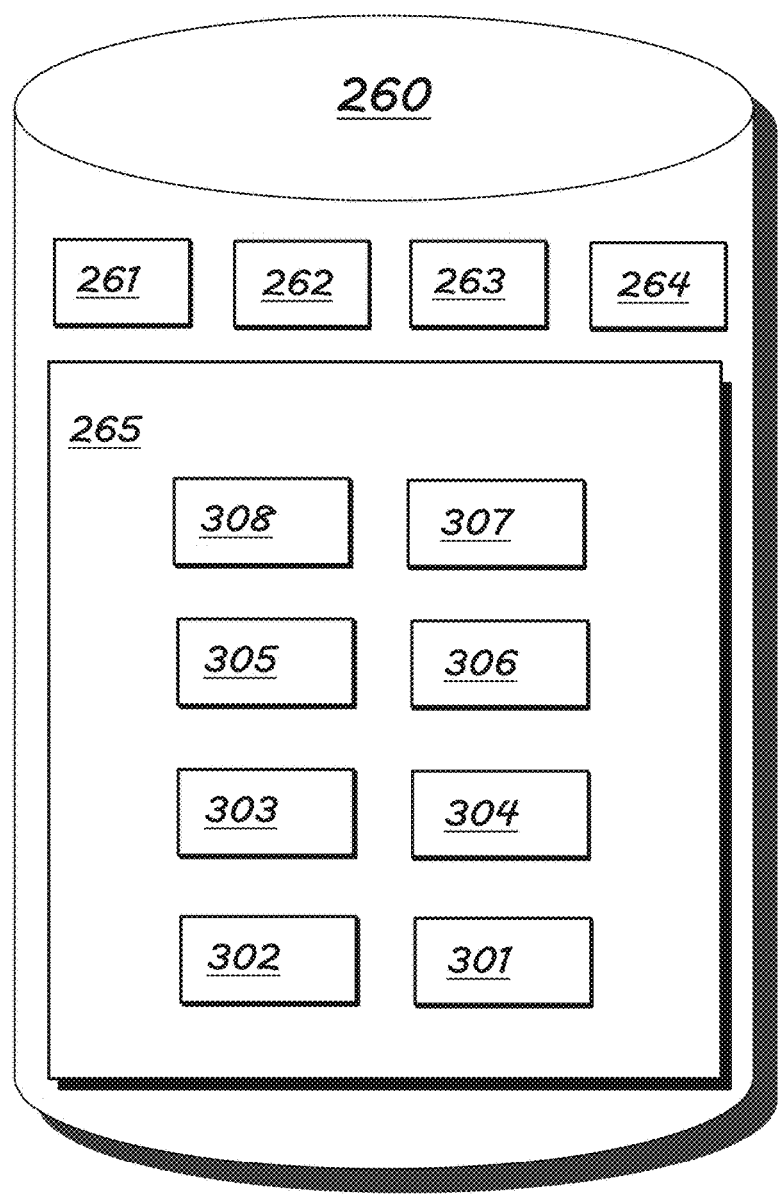
FIG. 3 illustrates further detail regarding components of a hardware storage device of an add-on device of FIG. 2.

FIG. 3 shows a schematic view of the hardware storage device 260 of FIG. 2, with an emphasis on exemplary components of the add-on device OSC module 265.

As mentioned, the OSC module 265 in various embodiments may not be a module, per se, but a manner of representing or grouping various constituent modules (e.g., modules 301, 302, etc., of FIG. 3) for purposes of the present disclosure.

Example components of the OSC module 265:
a synchronization module 301;
an audio/visual source and/or output module 302;
an analog to digital (A/D) and/or (D/A) conversion module 303;
a buffer-management module 304;
a quantification/packetization and/or dequantification/depacketization module 305;
an audio/visual encoder or decoder module 306;
an audio/visual input/output module 307;
a media-options presentation module 308;
an operating system module 309, which may be the same as, include, or be a part of the aforementioned operating system module 261.

The synchronization module 301 is configured to perform any synchronization functions for interactions between the primary add-on device $34_1$ and other apparatus, such as the secondary add-on device $34_2$ and the vehicle controller system 20. An example configuration includes the network time protocol (NTP). The synchronization can be performed in connection with the device $34_1$ having any of various roles, including performing in any one or more of:
 a client capacity—e.g., receiving media or communications from the vehicle system 20 directly, remote server, or the second add-on device $34_2$ for use or consumption at the primary add-on device $34_1$;
 a server capacity—e.g., providing media to the vehicle system 20 directly or via the second add-on device $34_2$, and
 a conduit capacity—e.g., passing information between any two of the vehicle system 20, another add-on device $34_2$, a remote system 50, and a network 40.

The audio/visual source or output module 302 comprises code managing receipt of audio or visual input. Example input includes analog data input from a microphone of the primary add-on device $34_1$ or another source, such as the second add-on device $34_2$ or a microphone in communication with the primary add-on device $34_1$. The input in contemplated embodiments includes visual data, such as from a sensor (e.g., a camera of the primary add-on device $34_1$) or another source, such as the second add-on device $34_2$ or a camera or visual sensor in communication with the primary add-on device $34_1$. The module 302 may include software for interacting with a microphone of the device 341, to, for instance, receive audio from a user, such as an oral request for the arrangement to play music—e.g., "please play jazz music."

The analog to digital A/D/D/A conversion module 303 converts analog signals to digital, and vice versa, as needed for further processing of the data received at the device $34_1$ and/or at other apparatus. Example other apparatus include the vehicle controller 20, the secondary add-on device $34_2$, and any relevant remote server 50. As described further below, other apparatus, such as the vehicle controller 20 may include related structure, such as by including a D/A converter to change digital data, received from the A/D converter of the add-on device $34_1$, back to analog for presentation by way of a vehicle speaker.

The buffer-management module 304 controls or manages buffering supporting functions of the primary add-on device $34_1$, such as temporary storage of data received or generated by the device $34_1$ or received from another apparatus, such as the vehicle 10, another add-on device, or peripheral. As described further below, other apparatus, such as the vehicle controller 20, may include similar structure.

The quantification/packetization or dequantification/depacketization module 305 performs, depending on which of various configurations it has, according various embodiments, any of data quantification, packetization, dequantification and depacketization.

The audio/visual encoder or decoder module 306 performs, depending in which of various configuration it has in various embodiments, any of audio data encoding, audio data decoding, visual data encoding, and visual data decoding.

The audio/visual input/output module 307 performs any of output and input functions regarding audio and/or visual data, depending on which of various configurations it has, according various embodiments. The module 307 is configured to send and/or receive media data using any suitable format or protocol.

Examples include Real-time Transport Protocol, or RTP, and User Datagram Protocol, or UDP. The data transferred is in various embodiments in digital format, having been received to the primary add-on device $34_1$ in that format, or having been converted from analog by the A/D convertor module 303. The audio or visual data transferred could have any of various sources, including having been generated at the add-on device $34_1$, and received at the device $34_1$, such as from an audio sensor (e.g., microphone) or visual sensor (e.g., camera) of the device $34_1$, as mentioned, an audio or visual sensor of the secondary add-on device $34_2$, or the vehicle 10, or a connected audio or visual sensor, connected to or in communication with the device.

The data transferred can include data for ancillary presentation at the vehicle 10 with the media. The data can include data indicating audio characteristics, such as tone, frequency, etc., of base audio (e.g., music). The ancillary data can be used at the vehicle 10 for presenting a visual of sound characteristics, such as light bars, waves, etc., and in some embodiments by various colors, or any known type of equalizer presentation.

The term head-unit is used primarily herein to describe the controlled vehicle control system including vehicle-user output components, such as a display screen. The head-unit processes, or allows in for presentation to the user, only select data, or data received only from a select channel or source. Approved sources include high-priority intra-vehicle sources, such as a vehicle autonomous driving system. Or an authenticated source, such as an add-on device of the present technology designed by the maker of the subject vehicle. Similarly, only select apparatus can obtain HU data, such as user-selection data indicating user selection amongst media options presented to the user—e.g., music or video channel options, infotainment genre options, the like or other.

The media-options presentation module 308 is configured by code to, when executed by the processing unit of a primary add-on device $34_1$, send presentation data to the vehicle CCS components 200, for causing the CCS components 200 to present media or infotainment options to the user. The presentation may be made, for instance, by way of a head-unit, or center-stack, display screen of the vehicle 10 and/or other output component(s) of the vehicle.

The secure and propriety nature of the HU unit is mentioned above. Generally, in various embodiments, access to the head-unit (HU) output components, and in some cases access to HU data, is limited. Security measures include allowing input of data received via a secure channel and/or from a secure or authenticated source. An example secure channel is an internal vehicle channel. A vehicle autonomous driving system, for instance, is recognized by the HU components as a secure source, able to cause display of notifications or alerts via the HU display.

For embodiments in which the primary add-on device $34_1$ is a plugged-in OBD add-on device $33_1$, the device sends presentation data to the CCS components 200 by way of the OBD port $36_1$ of the vehicle and associated bus and circuitry, such as a CAN bus system connected to the OBD port $36_1$. The primary add-on device $34_1$ is able to present data, such as media-options data, via the secured, controlled HU output component(s), because of the OBD communication channel and/or because of authenticating credentials that the device $34_1$ may be configured with for the purpose.

For embodiments in which the secondary add-on device $34_2$ is a plugged-in OBD add-on device $33_1$, the device also sends presentation data, received from another source such as a primary USB add-on device $33_2$, to the CCS components by way of the OBD port $36_1$ of the vehicle and associated bus and circuitry, such as a CAN bus system connected to the OBD port $36_1$. The secondary add-on device $34_2$ is able to present data, such as media-options data, via the secured, controlled HU output component(s), because of the OBD communication channel and/or because the device $34_2$ is properly credentialed.

In some embodiments, there is no add-on device 34 of the present technology communicating with the vehicle via the OBD port $36_1$. In these cases, the add-on device(s) 34, whether including a USB add-on device $33_2$, sends presentation data to the vehicle CCS components 200 in another manner. Other manners include USB connection and/or wirelessly, such a Bluetooth, ZigBee, or other.

Because these embodiments do not use an OBD port, add-on-device access to the HU componentry is not based on connection to the OBD channel. Rather in these embodiments the add-on device $34_1$ is able to present data, such as media-options data, via the secured, controlled HU output component(s), because of authenticating credentials that the device $34_1$ may be configured with for the purpose. It is also contemplated that the add-on device may, instead of or also because it has authenticating credentials, be able to present such data via the HU output because of a communication channel used, such as a particular wire connection or secure wireless connection established.

Any of the functions described in connection with the components of the add-on device OSC module 265 can be part of and performed by similar structure of another apparatus, such as the second add-on device $34_2$ and the host vehicle 10. Determination of which functions are performed where can be determined by a designer of the arrangement, or any component(s) thereof. In various embodiments, more than one of the devices in the arrangement of FIGS. 1 and 2 is configured to perform any of the mentioned functions of the OSC module 265.

In various embodiments, a designer of the arrangement, or any parts thereof, considers any of various factors to determine which functions are performed at which apparatus—e.g., whether packetization or other formatting, of data for use at the host vehicle 10, is performed at the primary add-on device $34_1$, or at the secondary add-on device $34_2$, for instance. In one example, if data for use at the vehicle, such as media data for presentation to the user at the vehicle, is generated and provided by one of the add-on devices $34_1$, $34_2$ to the vehicle 10 by way of the other $34_2$, $34_1$, than the second one can be performing simply a gateway (g/w) function, or interface, performing only basic formatting for use at the vehicle, if that.

In contemplated embodiments, one or more of the apparatus of the arrangement is configured to determine which of the apparatus has the various components of the add-on device OSC module 265 shown in FIG. 2, or at least which will perform one or more of the functions. The configuration includes being programmed with factors to determine which device is best for performing each subject function. Whether performed by a system designer, computing device, such as a computer system customized by the designer for the purpose, or by one of the apparatus in the arrangement, the determination(s) is based on one or more factors. Example factors include capabilities of the various apparatus, such as bandwidth, processing cost of performing the function(s) at each device, timing or processing speed, the like, or other.

IV. Additional Detail of Host Device—FIG. 4

FIG. 4 shows a schematic view of the hardware storage device 210 of FIG. 2, with an emphasis on exemplary components of the OSC module 214 of the host, vehicle 10.

As mentioned, the host OSC module 214 in various embodiments may not be a module, per se, but a manner of representing or grouping various constituent modules (e.g., modules 401, 402, etc., of FIG. 4) for purposes of the present disclosure. Example modules:

- a synchronization module 401;
- an audio/visual source or output module 402;
- an A/D and/or D/A conversion module 403;
- a buffer-management module 404;
- a quantification/packetization and/or dequantification/depacketization module 405;
- an audio/visual encoder and/or decoder module 406;
- an audio and/or visual input/output module 407;
- an operating system module 408, which may be, include, or be a part of the aforementioned operating system module 261;
- an applications framework module 409.

The synchronization module 401 is configured to perform any synchronization functions for interactions between the vehicle controller 20 and other apparatus such as the primary add-on device $34_1$ and/or the secondary add-on device $34_2$. An example configuration includes the mentioned NTP. The synchronization can be performed in connection with the vehicle CCS components 200 having any of various roles, including performing in any one or more of:

- a client capacity—e.g., receiving media or communications from the add-on device(s) $34_1$, $34_2$;
- a server capacity—e.g., providing media to the add-on devices $34_1$, $34_2$ and/or other apparatus such as a remote system 50, and
- a conduit capacity—e.g., passing information between any two of the first add-on device, the second add-on device, a remote system 50, and a network 40.

The audio/visual source or output module 402 comprises code managing receipt of audio or visual input. Example input includes analog data input from an audio device 232 such as microphone of the vehicle 10, or another source, such as a microphone in communication with the vehicle 10. The input in contemplated embodiments includes visual data, such as from a sensor such as a camera of the vehicle or another source, such as a camera connected to the vehicle 10.

The module 402 may include software for interacting with a microphone of the vehicle, for instance, to receive audio from a user, such as an oral request for the arrangement to play music, such as "play jazz music."

The A/D or D/A module 403 converts analog signals to digital, and vice versa, as needed for further processing of the data received at the vehicle 10 and/or at other apparatus, such as the primary and/or secondary add-on devices $34_1$, $34_2$, and any relevant remote server 50. As described further below, other apparatus, such as the add-on devices may include related structure, such as by including a D/A converter to change digital data, received from the A/D converter of the vehicle 10, for presentation by way of a vehicle speaker, or add-on device or peripheral speaker.

The buffer-management module 404 controls or manages buffering needs at the vehicle controller 20, such as temporary storage of data received at or generated by the controller 20. As described above, other apparatus, such as the add-on devices, may include similar structure.

The quantification/packetization or dequantification/depacketization module 405 performs any of data quantification, packetization, dequantification and depacketization.

The audio and/or visual encoder or decoder module 406 performs any of audio data encoding, audio data decoding, visual data encoding, and visual data decoding.

The audio and/or visual input/output module 407 performs output and/or input functions regarding audio and/or visual data. The module 407 is configured to send and/or receive media data using any suitable format or protocol, again, such as RTP or UDP. The data transferred is in various embodiments in digital format, having been received at the vehicle CCS components 200 in that format, or having been converted from analog by the A/D convertor module 403. Example sources of the audio or visual data include vehicle components, such as an audio sensor (e.g., microphone) or visual sensor (e.g., camera) of the vehicle 10. Other example sources of audio or visual data include an audio or visual sensor of the primary add-on device $34_1$, and an audio or visual sensor of the secondary add-on device $34_2$.

The applications framework module 408 may be a part of an OSC module 214, as indicated by reference numeral 409, or separate, as indicated by reference numeral 213. Regardless, the application framework module may include any of the characteristics described above with respect to its description under reference numeral 213.

Any of the functions described in connection with the components of the vehicle OSC module 214 can be part of and performed by similar structure of another apparatus, such as the first or second add-on device $34_1$, 34. Determination of which functions are performed by which apparatus can be determined by a designer of the arrangement of FIGS. 1 and 2, or any component(s) thereof. In various embodiments, more than one of the devices in the arrangement is configured to perform any of the mentioned functions of the vehicle OSC module 214.

In various embodiments, a designer of the arrangement, or any parts thereof, considers any of various factors to determine which functions are performed at which apparatus—e.g., whether packetization or other formatting, is performed at the vehicle system 20, the primary add-on device $34_1$, or at the secondary add-on device $34_2$.

As mentioned, in contemplated embodiments, one or more of the apparatus of the arrangement is configured to determine which of the apparatus has the various components of the OSC module 214 shown in FIG. 2, or at least which will perform one or more of the functions. The configuration includes being programmed with factors to determine which device is best for performing each subject function. Whether performed by a system designer, computing device, such as a computer system customized by the designer for the purpose, or by one of the apparatus in the arrangement, the determination(s) is based on one or more factors. Example factors include capabilities of the various apparatus, such as bandwidth, processing cost of having the function(s) performed at each device, timing or processing speed, the like or other.

V. Algorithms and Functions

Primary arrangements, processes, and algorithms by which the present technology is implemented are now described in more detail.

The algorithms are illustrated in part in the figures by the respective components shown, including schematically, and in some cases with visual communication indications, and in some cases without. Any and all operations, steps, and functions described herein can further readily be shown by a schematic flow chart, but are not in every case for brevity of the disclosure.

Operation flow may be added, without being new matter, to the disclosure based at least in part on these realizations. For instance, a process, described herein, by which an add-on device presents media options to the user via the vehicle interface 37, receives media from a remote, obtains the media from a remote source, and provides it to the vehicle after the user makes at-vehicle media selection via the vehicle, may be represented by blocks in a new figures corresponding to the same respective steps: (1) add-on device presenting to the user, via the vehicle, user media options, (2) add-on device receiving via the vehicle, user selections, and (3) add-on device providing media data received to the vehicle, without being new matter.

V.A. Use Cases Leveraging OBD Device Long-Range Transceiver—FIG. 5

As mentioned, in various embodiments, the primary add-on device $34_1$ (FIG. 2) may be an OBD device $33_1$ (FIG. 1).

The OBD device $33_1$ of this sub-section (II.A.) includes a long-range transceiver, which may be represented by numeral $250_2$, and associated wireless-interface module 262, of FIG. 2. The transceiver may include, for instance, a cellular transceiver configured according to the 3G, Long-Term Evolution (LTE), or other mobile telecommunication or data communication standard or policy.

Though the long-range transceiver of the OBD device $33_1$ is leveraged in these embodiments, the vehicle 10 may still have, and use, a vehicle long-range transceiver $30_2$.

The order of steps in the flow 500 is shown for illustrative purposes and any steps can be moved in order, or removed, and one or more steps can be added. Any of the steps shown or referenced may be performed by one or more of the apparatus described herein.

The process begins 501 and, at step 502, the OBD device $33_1$ of this sub-section (II.A.) receives streaming media directly from a remote source, such as the external network and remote server 40, 50.

At block 504, the OBD device $33_1$ provides media-option data to the vehicle by way of the OBD port $36_1$, such as data prescribing presentation at the vehicle display 37 of media options, such as AM, FM, XM, streaming app, or USB-channel media, or volume, tone, brightness, etc. The options in various embodiments include option data received from the remote source 50.

At block 506, user selections are received at the vehicle 10 and/or the device 34$_1$. For instance, once a user selects—via vehicle interface or device 33$_1$ interface (mic, etc.)—a streaming app by which to receive media, the OBD device 33$_1$ obtains further information regarding the stream app for the user to choose from, such as which genre or artist the user would like to hear and/or see.

At block 508, if the selected media is that which is to be obtained by the OBD device 33$_1$, such as a streaming media to be provided via the transceiver 250$_1$ of the OBD device 33$_1$, then the OBD device 33$_1$ obtains the media and provides it to the vehicle 10. The device 33$_1$ may first process the media data, such as using the modules described in connection with FIG. 3—quantification, packetization, etc.—before the media is provided to the vehicle 10 for presentation to the user by vehicle-user interface 230.

At block 510, in various embodiments, the OBD device 33$_1$ uses the OBD connection for use in presenting media options to the user (channel options, media options, etc.), such as via the OBD CAN bus and the head unit display 37, but for the actual media presentation, provides the media to the vehicle 10 by way of a secondary add-on device 34$_2$, such as the USB device. The second device 34$_2$ provides the media to the vehicle 10 by wire, or USB plug to vehicle USB port, or wirelessly, such as by wireless USB, depending on the configurations of the respective apparatus.

In various embodiments, the OBD device 33$_1$ uses the OBD connection for use in presenting media options to the user, such as via the OBD CAN bus and the head unit display 37, but for the actual media presentation, provides the media to the vehicle 10 by way of a wireless connection between the add-on device 33$_1$ (transceiver 250$_2$) and the vehicle 10 (transceiver 30$_2$), such as using the Bluetooth standard.

By connecting with an OBD port 36$_1$ of the vehicle, the OBD device 33$_1$ can have access, limited by any security measures at the vehicle 10, to receiving data that, depending on configurations, which may depend on model year of a subject vehicle, may not be available through other channels, such as through a USB connection or wireless connection to the vehicle. Example data includes vehicle data, such as engine rpm, brake data, speed, etc.

In some embodiments, only select vehicle data is available to the OBD device. The available data may, again depending on the particular configurations, include data that is not available to non-vehicle devices otherwise, such as via a USB or wireless connection.

The OBD connection may also allow the OBD device 33$_1$ to provide data to the vehicle 10 that it may not otherwise be able to do, again depending on the configurations of the arrangement, which may depend on vehicle model year. The OBD connection may also allow the OBD device 33$_1$ to control components of the vehicle 10, such as to cause a display 37 of the vehicle head unit, or center stack, to display media provided to it by the OBD device 33$_1$, which it may not otherwise be able to do, again depending on the configurations of the arrangement. In other words, in certain embodiments, without the OBD connection and configuration for using the same, the add-on device(s) would not be able to interact with the vehicle 10 to perform functions of the present technology such as presenting streaming media received at the add-on devices via vehicle-user interfaces such as vehicle speakers and display.

OBD device 33$_1$ access for input and/or output to/from the vehicle can be made via any suitable vehicle infrastructure connected to the OBD port, such as a vehicle Controller Area Network (CAN) bus and associated protocol.

The head unit, or center-stack, in various embodiments has a display protocol allowing various modules to activate functions of the head unit, such as outputting media via the display screen 37 or associated speakers, or controlling operation thereof, such as audio volume, tone, radio station, other media selection, visual-display brightness, or other operation characteristics of the head unit.

Head-unit operations are in various embodiments controlled by apparatus other than, or along with, control of head-unit operations by the OBD device 33$_1$. Example apparatus controlling head-unit operations include a navigation system, which may have a vehicle unit communicating with a remote navigation or customer service server 50, such as the mentioned customer-service center or system, such as the OnStar® system. Such remote system, via any applicable local, vehicle structure (e.g., onboard Onstar® unit) may also control the head-unit display. The OBD device 33$_1$ can perform such functions, such as controlling the head-unit display 37 for presenting navigation, or media options to the user—e.g., which type of media, such as radio or XM, and which channel, etc., for instance.

The vehicle 10 is configured to determine whether OBD devices have sufficient authority to access certain vehicle data and/or vehicle functions. An OBD device made by an original equipment manufacturer (OEM) of the vehicle may be configured such that the vehicle 10 recognizes that a higher level of vehicle data can be provided to the device as compared to an OBD device made by a third party. The vehicle can check identify and determine authorization level based on data received from the OBD device after it is connected to the vehicle 10.

The OBD device 22$_1$ can thus read at least some data received from the OBD port 36$_1$, and write data into the vehicle via the port 36$_1$. The data-in can include media data and in some embodiments can include programming data, to affect programming of a component of the vehicle, such as the head unit or infotainment system (e.g., firmware) of the vehicle 10.

The process may end 511 or any parts can be repeated.

V.B. Use Cases Leveraging Vehicle Long-Range Transceiver and OBD Device

The vehicle 10 of this sub-section (II.B.) includes a long-range transceiver, which may be represented by numeral 30$_2$, and associated wireless-interface module 212, of FIG. 2. The transceiver may include, for instance, a cellular transceiver configured according to the 3G, Long-Term Evolution (LTE), or other mobile telecommunication or data communication standard or policy.

Though the long-range transceiver of the vehicle 10 is leveraged in at least some of these use cases, the OBD device 33$_1$ may still have, and use, a device long-range transceiver 250$_2$.

The OBD device 33$_1$ of this sub-section (II.B.) receives streaming media from a remote server 50 via the vehicle transceiver 30, and intermediate network(s) 40.

The function is indicated by block 602 of the algorithm flow 600 of FIG. 6.

The order of steps in the flow 600 is shown for illustrative purposes and any steps can be moved in order, or removed, and one or more steps can be added. Any of the steps shown or referenced may be performed by one or more of the apparatus described herein.

Any data received at the OBD device $33_1$ from remote sources 40, 50, or provided from the OBD device $33_1$ to remote sources, via the OBD device long-range transceiver $250_1$ of the embodiments of the prior sub-section (II.A.), may in the embodiments of this sub-section (II.B.) be received by way of the vehicle long-range transceiver $30_2$, or possibly, for embodiments in which the OBD device $33_1$ has a long-range transceiver $250_1$, by way of the vehicle LRT $250_1$, depending on the embodiment.

The structure and operations of this sub-section (II.B) are represented by steps 601-611 in the flow 600 FIG. 6, like 501-511 of the flow 500 of FIG. 5, and can otherwise be like those of the prior sub-section (II.A), and so are not described in further detail. The OBD device may, for instance, provide media data to the vehicle 10 directly (reference directly communication lines 201, 202) or via an intermediary apparatus such as the second add-on device $34_2$, such as the USB device $33_2$, as was the case in the prior use cases.

V.C. Use Cases Leveraging Primary Add-On Device and Add-On Device or Vehicle Long-Range Transceivers In the embodiments of this sub-section, the primary add-on device $34_1$ is not connected to the vehicle by the OBD port $36_1$ of the vehicle 10 to perform add-on device functions. The primary add-on device $34_1$ in these cases may be a USB device $33_2$, whether configured for plug-in and/or wireless USB communications with the vehicle 10.

While the subject add-on device $34_1$ of these cases are thus referred to as a USB device $33_2$, the subject add-on device $34_1$ of these cases are however not limited to being a USB device. The add-on device 341 may be a user mobile phone, user wearable, or other add-on device configured to perform the functions described herein.

In at least some of the implementation cases of this sub-section (II.C), the USB device $33_2$ is the only add-on device used in the streaming of media via the vehicle 10. There is no secondary add-on device $34_2$ in these implementation cases.

The vehicle 10 of this sub-section (II.C.) as well may include a long-range transceiver, which may be represented by numeral $30_2$, and associated wireless-interface module 212, of FIG. 2. Though the long-range transceiver of the vehicle 10 is leveraged in at least some of these use cases, the USB device $33_2$ may still have, and use, a long-range transceiver $250_2$ of the device $33_2$.

The USB device $33_1$ of this sub-section (II.B.) receives streaming media from the remote server 50, and intermediate network(s) 40, via the vehicle transceiver 30 or device transceiver $250_2$.

The function is indicated by block 702 of the algorithm flow 700 of FIG. 7.

The order of steps in the flow 700 is shown for illustrative purposes and any steps can be moved in order, or removed, and one or more steps can be added. Any of the steps shown or referenced may be performed by one or more of the apparatus described herein.

Any data received at the OBD device $33_1$ from the remote sources 40, 50, or provided by the OBD device $33_1$ to remote sources, via the OBD device $33_1$ transceiver $250_1$ or vehicle transceiver $30_1$ of the embodiments of the prior sub-sections (II.A., II.B.), may in the embodiments of this sub-section (II.C.) be received by way of the vehicle long-range transceiver $30_2$ or, in embodiments in which the USB device $33_2$ has a long-range transceiver $250_1$, possibly by way of that transceiver $250_1$, depending on the embodiment.

The structure and operations of this sub-section (II.C) are represented by steps 701-711 of the flow 700 of FIG. 7, like 501-511 and 601-611 of the flows of FIGS. 5 and 6, and can otherwise be like any described in the prior sub-sections (II.A., II.B.), and so are not described in further detail. The USB device $33_2$ may provide, for instance, media data to the vehicle 10 by plug-in, or wire, or wirelessly—reference, e.g., direct communication lines 201, 202.

V.D. Summary of Use Cases

In the use cases described in the sub-sections above, and elsewhere in the specification and drawings, by the novel apparatus and algorithms, legacy vehicles especially can be leveraged to use the built-in display and/or audio functions of the vehicle in ways previously not possible for a non-vehicle device, such as the add-on device controlling the head-unit display of the vehicle by way of the OBD port to present media options from which the user can select. The technology may also, by way of the one or more add-on devices described herein, allow for use via the vehicle of applications or programs that are not native to the vehicle and, prior to the present technology, were not able to be implemented by way of a non-vehicle device and the vehicle.

In prior systems, for instance, a non-vehicle device could simply only provide audio to the vehicle, by way of a USB port or wirelessly, but not control the vehicle head unit for presenting, via a vehicle screen or other HMI, selectable user options, let alone then follow the selection with obtaining, by the non-vehicle device, appropriate media, such as streaming media from a remote source, and presenting to the user via the vehicle.

Some newer vehicles will be programmed with vehicle-device interoperability standards allowing integration between devices such as smartphones and the vehicle's infotainment system, to allow presentation of phone functions, such as presenting a navigation map of the phone via a vehicle display. Example interoperability standards that a vehicle can be programmed with include CarPlay, Android Auto, and MirrorLink. (CARPLAY and MirrorLink are registered trademarks of the Apple Inc. and Car Connectivity Consortium LLC, respectively). By the present technology, including by embodiments such as those of the third sub-section (II.C.), vehicles programmed with such interoperability standards can be leveraged by the add-on devices of the present technology, which enable add-on device control of the vehicle head-unit display 37, such as to display media channel options (XM, FM, USB, etc., genres, artists, etc.), such as in connection with a streaming media app, which was not possible before.

VI. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A portable communication device, for implementation with a host vehicle of transportation having an on-board diagnostics port and a limited-access head-unit display, comprising:

an on-board diagnostics connector sized and shaped to connect to the on-board diagnostics port of the host vehicle;

a hardware-based processing unit in communication with the on-board diagnostics connector; and a non-transitory storage device in communication with the processing unit, the storage device comprising:

a media-options presentation module that, when executed by the processing unit:

sends, by way of the on-board diagnostics connector and port, media-options data to the host vehicle for presenting user media options by way of the limited-access head-unit display; and receives user-selection data responding to the user media options; and a media streaming module that, when executed by the processing unit:

obtains streaming media based on the user-selection data; and sends the streaming media to the host vehicle for presentation;

wherein the media streaming module, when executed by the processing unit to obtain the streaming media based on the user-selection data, obtains the streaming media from a remote server;

the portable communication device is a primary portable communication device;

the primary portable communication device comprises a short-range wireless transceiver configured to communicate with a secondary portable communication device; and the media streaming module, when executed by the processing unit to obtain the streaming media based on the user-selection data and from the remote server, communicates with the secondary add-on device to obtain the streaming media from the secondary add-on device having received the streaming media from the remote server.

2. The portable communication device of claim 1 wherein the streaming media includes audio media.

3. The portable communication device of claim 1 further comprising:

a sensor configured to sense user input;

an audio source module that, when executed by the processing unit, obtains user-input data from the sensor; and an activity module that, when executed by the processing unit, initiates an action in response to the user-input data obtained.

4. The portable communication device of claim 3 wherein the action includes sending the user-input data to the host vehicle.

5. The portable communication device of claim 3 further comprising:

an analog-to-digital conversion module;

wherein the action includes converting the user-input data to digital format for further processing or use at the portable communication device or at the host vehicle.

6. The portable communication device of claim 5 wherein the further processing includes quantification or packetization of the user-input data.

7. The portable communication device of claim 1 wherein the media streaming module, when executed, sends the streaming media to the host vehicle for presentation by way of the on-board diagnostic connector of the portable communication device and the on-board diagnostic port of the host vehicle.

8. A hardware-based, non-transitory, storage device, for implementation at a portable communication device having an on-board diagnostics connector and a hardware-based processing unit connected to the on-board diagnostics connector, comprising:

a media-options presentation module that, when executed by the hardware-based processing unit:

sends, to a host vehicle, by way of the on-board diagnostics connector and a matching host-vehicle on-board diagnostics port, media-options data, for presenting user media options by way of a limited-access head-unit display of the host vehicle; and receives user-selection data responding to the user media options; and a media streaming module that, when executed by the processing unit:

causes the host vehicle to obtain streaming media for presentation based on the user-selection data;

wherein the host vehicle includes a long-range communication transceiver;

the media streaming module, when executed by the processing unit to obtain the streaming media based on the user-selection data, causes the host vehicle to obtain the streaming media from a remote server; and the media streaming module, when executed by the processing unit to obtain the streaming media based on the user-selection data, communicates with the host vehicle to cause the host vehicle to obtain the streaming media from the remote server by way of the long-range communication transceiver of the host vehicle.

9. The portable communication device of claim 1 wherein:

the secondary add-on device comprises a long-range wireless transceiver configured to communicate with a communication network beyond the vehicle; and the media streaming module, when executed by the processing unit to obtain the streaming media based on the user-selection data, obtains the streaming media from the remote server by way of the long-range wireless transceiver and the communication network.

10. The hardware-based, non-transitory, storage device of claim 8 wherein:

the portable communication device is a primary portable communication device;

the primary portable communication device comprises a short-range wireless transceiver configured to communicate with a secondary portable communication device; and the media streaming module, when executed by the processing unit to send the streaming media to the host vehicle for presentation, sends the streaming media to the secondary add-on device for sending to the host vehicle for presentation.

11. A portable communication device, for implementation with an add-on on-board diagnostic device and a host vehicle of transportation having an on-board diagnostics port and a limited-access head-unit display, comprising:

a short-range wireless transceiver;

a hardware-based processing unit in communication with the short-range wireless transceiver; and a non-transitory storage device in communication with the processing unit, the storage device comprising a media streaming module that, when executed by the processing unit:

obtains media-selection data, via the short-range wireless transceiver, from the add-on on-board diagnostic device;

obtains, from a remote source, based on the media-selection data, streaming media; and sends the streaming media obtained for presentation at the host vehicle;

wherein the add-on on-board diagnostic device is separate from the portable communication device and includes an on-board diagnostics connector, and wherein the add-on on-board diagnostic device is configured to:

send, by way of the on-board diagnostics connector and the on-board diagnostics port of the host vehicle, media-options data to the host vehicle for presenting user media options by way of the limited-access head-unit display;

receive the media-selection data responding to the user media options; and send the media-selection data to the portable communication device via a connection between a short-range wireless transceiver of the add-on on-board diagnostic device and the short-range wireless transceiver of the portable communication device.

12. The portable communication device of claim 11 wherein the media streaming module, when executed to send the streaming media obtained for presentation at the host vehicle, sends the streaming media obtained to the host vehicle by way of the add-on on-board diagnostic device.

13. The portable communication device of claim 11 wherein:

the host vehicle comprises a long-range transceiver; and the media streaming module, in obtaining the streaming media, obtains the streaming media by way of the long-range transceiver of the host vehicle.

* * * * *